(12) United States Patent
Weber et al.

(10) Patent No.: US 6,581,382 B2
(45) Date of Patent: Jun. 24, 2003

(54) METHOD AND APPARATUS FOR CONTROLLING A SUPPLY SYSTEM FOR A COMBUSTION ENGINE

(75) Inventors: Siegfried Weber, Stuttgart (DE); Joachim Wiltschka, Fellbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/014,835

(22) Filed: Dec. 14, 2001

(65) Prior Publication Data

US 2002/0088228 A1 Jul. 11, 2002

(30) Foreign Application Priority Data

Dec. 14, 2000 (DE) .......................... 100 62 350

(51) Int. Cl.$^7$ ................................ F02D 23/00
(52) U.S. Cl. ................ 60/602; 60/600; 60/601; 60/603; 123/564
(58) Field of Search ................ 60/600, 601, 602, 60/603; 123/564

(56) References Cited

U.S. PATENT DOCUMENTS

| | | | | |
|---|---|---|---|---|
| 4,860,210 A | * | 8/1989 | McCombie | 123/352 |
| 5,155,998 A | | 10/1992 | Monden | 60/602 |
| 5,420,793 A | * | 5/1995 | Oo et al. | 123/352 |
| 5,680,763 A | * | 10/1997 | Unland et al. | 60/602 |
| 5,867,986 A | * | 2/1999 | Buratti et al. | 60/602 |
| 6,128,902 A | * | 10/2000 | Kolmanovsky et al. | 60/602 |
| 6,308,517 B1 | | 10/2001 | Fausten et al. | 60/602 |

FOREIGN PATENT DOCUMENTS

| | | | | |
|---|---|---|---|---|
| DE | 3943010 | 12/1989 | | F02B/37/12 |
| DE | 19801395 | 1/1998 | | F02B/33/44 |

* cited by examiner

Primary Examiner—Sheldon J. Richter
(74) Attorney, Agent, or Firm—Crowell & Moring LLP

(57) ABSTRACT

A method for controlling a supercharging device for an internal combustion engine includes controlling a variable (x) using different control characteristics in each of at least four sub-ranges defined by a gradient (dx/dt) of the variable to be controlled (x) and a difference (□x) between the variable to be controlled (x) and a control variable ($x_s$). An apparatus for controlling a supercharging device for an internal combustion engine includes a controller having a range of control that includes at least four sub-ranges devided in accordance with a gradient (dx/dt) of the variable to be controlled (x) and a difference (□x) between the variable to be controlled (x) and a control variable ($x_s$).

25 Claims, 2 Drawing Sheets

METHOD AND APPARATUS FOR CONTROLLING A SUPPLY SYSTEM FOR A COMBUSTION ENGINE

BACKGROUND AND SUMMARY OF THE INVENTION

This application claims the priority of German Patent Document 100 62 350.6, filed Dec. 14, 2000, the disclosure of which is expressly incorporated by reference herein.

The invention relates to a method and apparatus for controlling a supercharging device for an internal combustion engine, especially in a motor vehicle.

A known system for controlling the boost pressure of an internal combustion engine with an exhaust turbocharger is described in German patent specification DE 39 43 010 C2. To regulate boost pressure, a blow-off valve is opened or closed according to a duty cycle of a trigger signal. In stable driving conditions, a duty cycle is taken from a table in which duty cycle values are listed in relation to the actual intake line pressure and engine speed. In this manner, the boost pressure can be kept at a maximum permissible pressure limit. If the permissible pressure limit is exceeded during partial-load operation, the base duty cycle is corrected with the aid of a proportional and integral (PI) controller in order to return the intake line pressure to a value below the pressure limit. During full load operation, the base duty cycle is also corrected with the aid of the PI controller, in order to keep the intake line pressure close to the pressure limit. During full load operation, this type of PI controller operation only takes place when, on the one hand, the intake line pressure falls within a range surrounding the pressure limit and, on the other hand, a local maximum intake line pressure was exceeded and the intake line pressure gradient is therefore less than zero. Accordingly, strong surges in supercharging pressure during the acceleration of a vehicle is avoided because an integral (I) controller is only activated after a local intake line pressure maximum is exceeded and when the intake line pressure is already approaching the pressure limit.

German disclosure document DE 198 01 395 A1 discloses a device for controlling boost pressure in an exhaust gas turbocharger with a variably adjustable turbine geometry. In this device, the air mass flow in the suction pipe, in an initial low load and/or RPM range, is used as a control variable for the exhaust gas re-circulation control device. In a second, higher load and/or RPM range, the boost pressure in the suction pipe is used as the control variable. The control device may be provided with a single controller in which the control variable is switched between the air mass flow and the boost pressure.

The invention relates to a method and apparatus for controlling a supercharging device with which an improved dynamic and an improved quality of control are achieved for all types of exhaust gas turbochargers.

To this end, a method is provided, according to the present invention, for controlling a supercharging device for an internal combustion engine, especially an exhaust gas turbocharger for a diesel engine of a motor vehicle, in which a range of control is divided into at least four sub-ranges, each having different control characteristics, depending on a gradient of the variable being controlled and a difference between the variable being controlled and a control variable. As a result of these measures, an improved dynamic and improved quality of control can be attained by adjusting the control characteristic to conform to a given condition of operation. If the control difference is constant but the gradients are variable, various control segments can be set and a variable control characteristic can be achieved. The control variable or the set value can be derived from a characteristic field, such as a set value plotted against load and engine speed for boost pressure, or an air mass flow plotted against the desired injection volume and the engine speed. An exhaust gas turbocharger with variable turbine geometry, the settings of which are adjusted, can be provided as a supercharging device.

In a further embodiment of the invention, it is provided that the sub-ranges are subdivided according to a positive or negative difference between the variable being controlled and the control variable, and according to a positive or negative gradient of the variable being controlled. As a result of these measures, the range of control is divided into four sub-ranges or four quadrants, with a subdivision of this nature being especially suitable for controlling a supercharging device of an internal combustion engine. Thus, aggressive control parameters are preferably used with positive gradients of the variable being controlled, so that a high dynamic is achieved with increases in the variable being controlled, such as the boost pressure. On the other hand, defensive control parameters are used with negative gradients of the variable being controlled, so that, for example, undershooting at decreasing boost pressure can be avoided and a high quality of control can be attained. In contrast to conventional controllers, this not only makes allowances for the difference between the variable being controlled and the control input or the set value, but also for the dynamic behavior of the variable being controlled. In this manner, the variable being controlled can be adjusted more quickly to a predetermined set value without running the risk of significant overshoot or undershoot. If, for example, a PI controller is provided, two characteristic fields can be provided for each quadrant, in which fields the P component and/or the I component is stored as a factor of the gradient of the variable being controlled and the control difference.

In a further embodiment of the invention, the control characteristic is determined by proportionally acting and integrating controller components and, in the case of negative gradients of the variable being controlled, a stronger emphasis is placed on the controller components with integrating action. As a result of these measures, undershooting at negative gradients of the variable being controlled is avoided and/or the variable being controlled is gradually brought closer to the reference variable.

In a further embodiment of the invention, it is provided that the control characteristic is determined by proportionally acting and integrating controller components and, in the case of positive gradients of the variable being controlled, that a stronger emphasis is placed on the proportionally acting controller components. As a result of these measures, a high dynamic can be achieved at boost pressure below the set value and minor overshooting at boost pressure above the set value when the gradients of the variable being controlled are positive, such as in the case of increasing boost pressure, by quickly returning the boost pressure to the set value.

In a further embodiment of the invention, it is provided that controller components with integrating action are only activated to the control characteristic once the variable being controlled has almost reached the control variable, falling within a predetermined range around the control variable. As a result of these measures, a high dynamic and rapid approaching of the control variable is achieved, as controller components with integrating action are only activated when the variable being controlled has almost reached the control variable. On the other hand, a high quality of control is achieved, especially within a predetermined range around the control variable, as the controller components with integrating action then provide for precise adjustment of the set value.

In a further embodiment of the invention, a default value of the supercharging device and a correction of the default value, which are subject to the actual fuel injection volume, are provided. Such a correction of the default value is especially advantageous in a diesel engine. To limit exhaust smoke during full load acceleration from low engine speeds, the fuel injection volume must be restricted, thus preventing the available fuel injection volume from providing the necessary exhaust gas energy. As a result of the dynamic correction of the default value, the settings for the control variables of the supercharging device are corrected in the direction of an increase in exhaust gas energy. The advantage of providing a dynamic correction of the default value instead of applying aggressive control parameters is that there is no risk of overshoot, as the control characteristic does not have to be designed for an increase in exhaust gas energy, even in the sub-range in question. An outcome of the corrected default value is linked to an outcome of the control procedure.

In a further embodiment of the invention, it is provided that an air mass flow in the suction path is used as control variable. The use of an air mass flow as control variable, i.e., of one air mass per stroke or crank disk segment, offers various advantages during operation of an internal combustion engine. For example, only one control variable is needed for the entire range of operation, i.e., both operation with exhaust gas re-circulation and supercharging operation, because a predetermined set value is provided on the basis of the air mass flow across the entire range of operation. A predetermined set value can be provided by a single characteristic field for operation with exhaust gas re-circulation and for supercharging operation, in that the air mass flow is applied as a function of the desired injection volume and engine speed. In contrast to boost pressure, the air mass flow provides more information, especially when the intake channels become clogged with dirt, and precisely reflects the filling of the cylinders, regardless of suction pipe temperature and atmospheric pressure. The air mass flow is measured with an air mass gauge. In contrast to the measurement of boost pressure, where suction tube temperature must be taken into account, only one sensor is required to measure air mass flow, thus reducing the impact of sensor errors.

In a further embodiment of the invention, it is provided that a set value of the air mass flow is limited by a characteristic field of the maximum allowable air mass flow, in which the maximum allowable air mass flow is stored as a function of the engine speed and the supercharging air temperature. As a result of these measures, engine protection can be achieved by limiting the maximum allowable combustion chamber pressure.

In a further embodiment of the invention, it is provided that an exhaust gas turbocharger is provided as a supercharging device, and that a set value of the control variable is verified using a limiting characteristic curve of the maximum allowable compression ratio of the exhaust gas turbocharger. These measures enable the turbocharger to be protected against overspeed and pumping operation.

In a further embodiment of the invention, it is provided that an exhaust gas turbocharger is provided as a supercharging device, and that, to detect unstable operating points of the exhaust gas turbocharger, fluctuations in supercharging pressure and/or in air mass flow in the suction path are recorded and analyzed and, in the event of detection of an unstable state, the maximum allowable compression ratio of the exhaust gas turbocharger is reduced. In this manner, the turbocharger can be protected against pumping operation, i.e., unstable operation. If an air column in the suction path begins to vibrate, the share of the resonant frequency of the air column increases. If the amplitude of the resonant frequency exceeds a predetermined value, pumping operation is present, and the maximum allowable compression ratio does not have to be reduced as drastically to remove the exhaust gas turbocharger from unstable operation.

In accordance with another aspect of the invention, an apparatus for controlling a supercharging device for an internal combustion engine includes a controller that has a range of control. The range of control includes at least four sub-ranges that are divided in accordance with a gradient (dx/dt) of the variable to be controlled (x) and a difference ($\Delta$x) between the variable to be controlled (x) and a control variable ($x_s$).

In accordance with a further aspect of the invention, a method for controlling a supercharging device for an internal combustion engine includes (1) dividing a range of control into at least four sub-ranges in accordance with a gradient (dx/dt) of the variable to be controlled (x) and a difference ($\Delta$x) between the variable to be controlled (x) and a control variable ($x_s$), and (2) controlling a variable (x) using different control characteristics in each of the at least four sub-ranges.

Other objects, advantages and novel features of the present invention will become apparent from the following detailed description of the invention when considered in conjunction with the accompanying drawings.

DETAILED DESCRIPTION OF THE DRAWINGS

Figure 1:
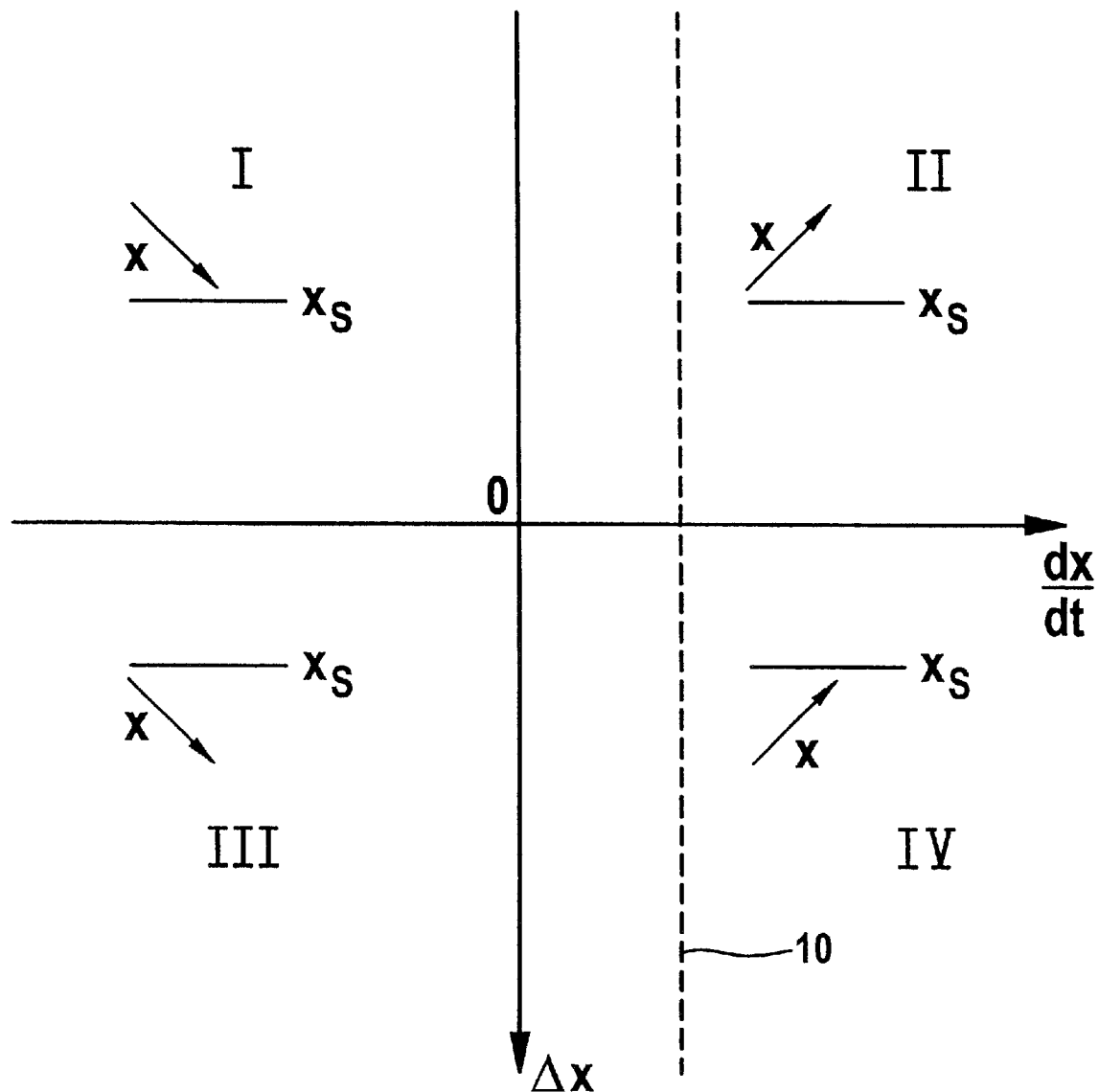
FIG. 1 shows a depiction of a range of control, divided into quadrants, which is used in the method and apparatus according to the present invention.

FIG. 1 depicts the range of control used in a preferred embodiment of the invention. A gradient dx/dt of a variable to be controlled x is plotted on the X-axis of FIG. 1. According to this embodiment, the variable to be controlled x is an air mass flowing through the suction path of an internal combustion engine. The air mass flowing through the suction path is indicated in milligrams per segment of a cam shaft disk. The change over time of this air mass x flowing through the suction path is indicated by the gradient dx/dt.

A control difference $\Delta$x is plotted on the Y-axis in FIG. 1. The control difference $\Delta$x is the difference between the actual value x of the air mass flowing through the suction path and a set value $x_s$ of the air mass flow. Negative control difference $\Delta$x values are plotted above the X axis in FIG. 1, where the actual measured air mass flow x is larger than the set value $x_s$. Positive control difference $\Delta$x values are plotted below the X axis in FIG. 1, where the actual value for air mass flow x is smaller than its set value $x_s$.

As shown in FIG. 1, the range of control is divided into four quadrants. A negative gradient dx/dt is present on the left side of the Y-axis, in which the value for the actual measured air mass flowing through the suction path decreases over time. In contrast, the gradient dx/dt is greater than zero to the right of the Y-axis, meaning that the value for the actual measured air mass is increasing. The four quadrants are marked as I, II, III, and IV.

A dotted line bisecting the quadrants II and IV depicts the range of application of a conventional controller at a constant engine speed. In conventional controllers, a distinction is only made between whether the control difference Δx is greater or less than zero.

However, whether the variable to be controlled happens to be moving away from or toward the control variable is not taken into account. These circumstances are only taken into account by the method according to the present invention, in that this method uses the gradient of the variable to be controlled to determine the control characteristic.

Each of the four quadrants I, II, III, and IV features a different control characteristic. For example, a generally defensive controller application is provided in quadrants I and III, in which the gradient of the variable to be controlled x is negative. In contrast, a generally aggressive controller application is provided when the gradient of the variable to be controlled x is positive, i.e., when the air mass flowing through the suction path is increasing—in quadrants II and IV. This makes it possible to attain a favorable dynamic when the air mass flow is increasing, such as when the vehicle accelerates. By contrast, a high quality of control and the avoidance of undershoot is preferred in the case of negative gradients or a reduction in the air mass flowing through the suction path.

A generally defensive controller application in quadrants I and III is achieved with defensive control parameters, such as, by placing a stronger emphasis on a controller component with integrating action and/or placing little or no emphasis on proportionally acting controller components. In quadrants II and IV, however, aggressive control parameters are applied and a stronger emphasis is placed on the proportionally acting controller components, with little or no emphasis placed on controller components with integrating action. In this manner, a high dynamic can be achieved during, for example, acceleration of the vehicle, when the air mass flowing through the suction path is smaller than the set value $x_s$ and the air mass is increasing, i.e., in quadrant IV. In this situation, as the proportionally acting controller components quickly pull the air mass flowing through the suction path up to the predetermined set value. If the actual value of the air mass flowing through the suction path exceeds the set value, i.e., in quadrant II, the stronger emphasis on the proportionally acting controller component, with its aggressive control parameters, ensures that overshoot remains minimal. If the value of the air mass flowing through the suction path has exceeded a local maximum and exhibits a falling tendency, the gradient of the variable to be controlled is less than zero (the controller is located in quadrant I). In this case, a stronger emphasis is placed on the controller components with integrating action to ensure that no undershoots occur if the air mass flowing through the suction path is reduced to the set value.

Dividing the range of control into quadrants I, II, III, and IV makes it possible to achieve a high dynamic during supercharging operation of an internal combustion engine, while at the same time improving the quality of control. As a result, a vehicle responds spontaneously to the driver's wishes, as expressed by his use of the gas pedal, without the occurrence of an unwanted time delay, or what is known as a turbo hole. At the same time, the improved quality of control reliably protects the engine against unallowably high levels of combustion chamber pressure.

Figure 2:
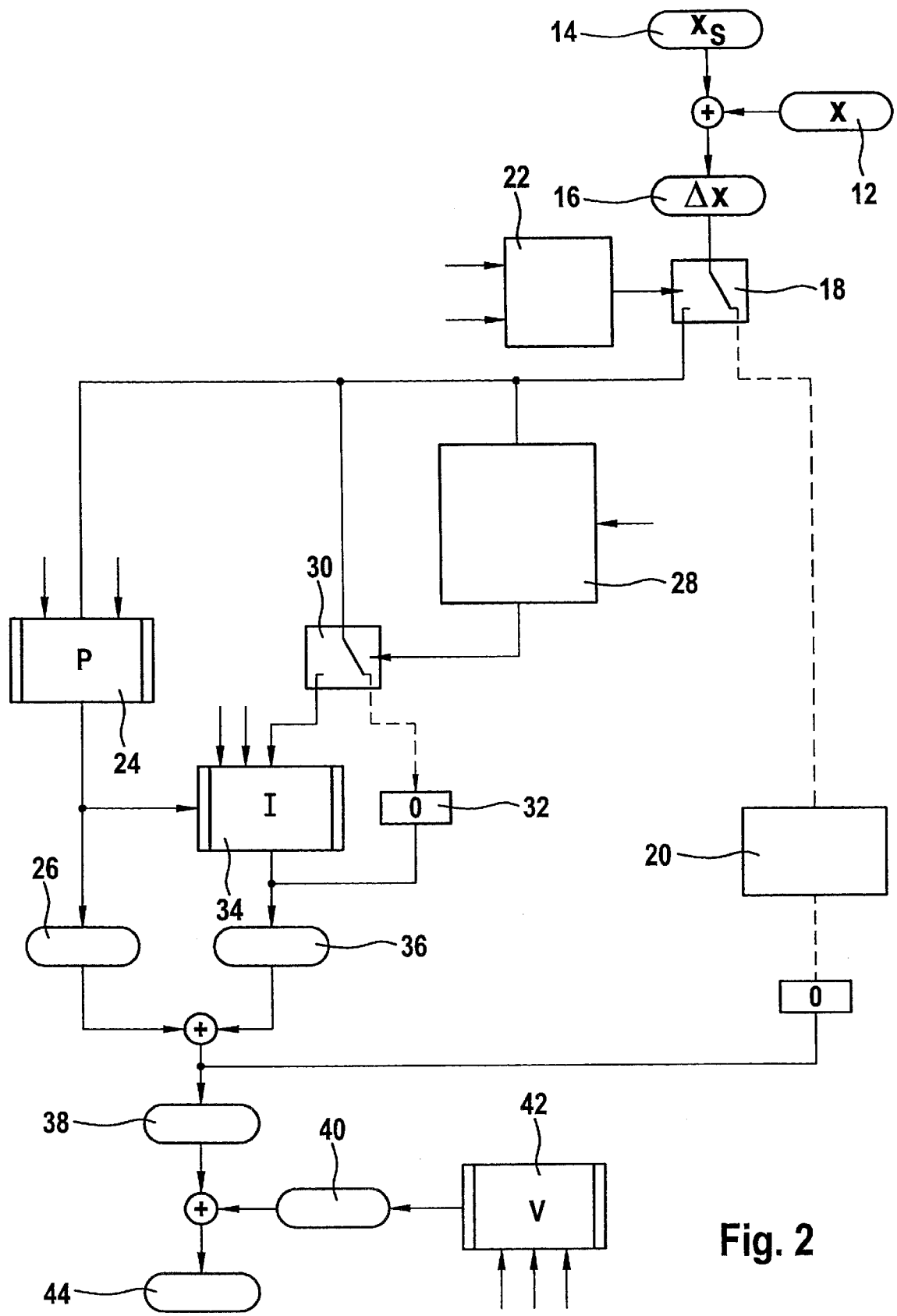
FIG. 2 shows a schematic depiction of the method according to the present invention.

The schematic depiction in FIG. 2 is provided to clarify the method according to the present invention. A current actual value x for the air mass flowing through the suction path is measured in step 12 and additively linked to the set value $x_s$ for the air mass flow determined in step 14 by means, for example, of a characteristic field. Consequently, the control difference Δx is obtained in step 16. The exclusive purpose of step 20 is to ease the application of the pilot values. Step 22 was defective documentation. Step 18 is activated by a constant: controller ON/OFF.

If control of the supercharging device has been released in step 22, the control difference Δx is not equal to zero, a switch occurs in step 18, and a proportionally acting controller component or P component of the control system is determined in step 24. To this end, it is first determined in which quadrant I, II, III, or IV the current values of the gradient dx/dt and of the control difference Δx are located. Depending on the quadrant determined, the P component is determined in step 24. To this end, a separate characteristic field is stored for each quadrant I, II, III, and IV, in which characteristic field the P component is stored over the gradient of the air mass flow and the control difference. The P component determined in this manner is then available in step 26.

Beginning with the outcome of step 18, it is determined in step 28 whether a controller component with an integrating action or an I component can be released. To this end, for example, it is determined whether the current value of the air mass flowing through the suction path has almost reached the control variable or the set value, and falls within a predetermined range around the control variable. Only when these conditions are in place does a switch occur in step 30 from setting the I component to zero in step 32 to determining the I component in step 34. To determine the I component in step 34, it is first determined in which quadrants, I, II, III, or IV, the current values of the gradient of the air mass flowing through the suction path and the control difference Δx are located. Depending on the quadrant determined, the I component is then determined on the basis of characteristic fields, wherein the P component determined in step 24 is also taken into account. The I component determined in this fashion is then issued in step 36.

The P component from step 26 and the I component from step 36 are then additively linked, so that the portion of the control variable determined by the PI controller is available in step 38. The controller portion of the control variable from step 38 is additively linked to a pilot portion of the control variable from step 40, which was determined in pilot step 42. Once the controller portion of the control variable from step 38 and the pilot portion of the control variable from step 40 have been linked, the calculated control variable is available in step 44 for adjustment of the supercharging device.

During the pilot procedure in step 42, the supercharging device is preset to a default value on the basis of a basic characteristic field and as a factor of such parameters as the atmospheric pressure, the air temperature, the load, and the engine speed. In addition, a dynamic pilot correction is made which represents the unsteady portion of the pilot procedure. This dynamic pilot correction is only completed when a limit is applied to smoke emissions during acceleration from low engine speeds. As a result of the smoke limitation, the injected fuel volume is reduced by the engine control device, so that less exhaust energy is available for the supercharging device, e.g., the exhaust gas turbocharger, than if the injected fuel volume were not reduced. However, this also means that there is a lack of the exhaust gas energy that would be needed for dynamic acceleration or for exhaust gas re-circulation. To compensate for this lack of exhaust gas energy, the pilot values are increased in order to increase the amount of available exhaust gas energy. The advantage of this approach is that no aggressive controller components are needed to compensate for the lack of exhaust gas energy, and so that the supercharging device can be adjusted as necessary. Such aggressive controller components would cause the control circuit to fluctuate undesirably at higher engine speeds.

To protect the engine and the exhaust gas turbocharger, various measures are provided during air mass-controlled supercharging operation, i.e., when the air mass flowing through the suction path is used as a control variable.

On the one hand, a characteristic field is provided by plotting the maximum set values of the air mass flow in the suction path against the engine speed and the supercharging air temperature. Limiting the adjusted set values by this characteristic field ensures that the engine is not operated at impermissibly high boost pressure levels at higher charging temperatures, due to lower air density, and that the maximum permissible combustion chamber pressure is not exceeded.

On the other hand, the set values of the air mass flowing through the suction path are limited by a limiting characteristic curve, which takes into account the maximum permissible compression ratio of the exhaust gas turbocharger. Using a reference temperature and a reference pressure, the maximum permissible compression ratio of the exhaust gas turbocharger for a specific operating point can be converted into the maximum permissible air mass flow in the suction path. This ensures that the exhaust gas turbocharger is protected against pumping operation and overspeed. The resulting maximum permissible set value for the air mass flow is filtered as a safeguard, because exceeding the maximum permissible compression ratio of the exhaust gas turbocharger for a short period of time, such as during dynamic adjustment of a high jump in the set value, does not subject the exhaust gas turbocharger to the risk of pumping or overspeed. However, if a high jump in the set value is adjusted slowly, such as in a high gear but at a low engine speed, or at virtually stationary operation of the exhaust gas turbocharger, the maximum permissible compression ratio of the exhaust gas turbocharger must be limited.

In addition, the boost pressure is limited on the compressor side of the exhaust gas turbocharger to protect the boost pressure hoses and the corresponding connectors. A constant predetermined limit pressure is used for this purpose. During air mass controlled operation, this predetermined limit pressure is converted into a maximum permissible air mass flow.

As a result of the method according to the present invention, the compressor characteristic field of the exhaust gas turbocharger is fully utilized without having to make allowances for a safety buffer against unstable operation, such as to make allowances for aging processes or series dispersion. Therefore, a so-called pump detection system is provided according to the present invention, permitting the detection of unstable operating points of the exhaust gas turbocharger. To achieve this, fluctuations in boost pressure or in the air mass flow in the suction path are recorded and evaluated. During unstable operation or pumping operation of the exhaust gas turbocharger, the air column in the suction path begins to vibrate. These fluctuations can be detected on the basis of the current boost pressure or the current air mass flow. If the share of the resonant frequency of the air column increases beyond a certain level, so-called pumping operation is present. In this case, the maximum permissible compression ratio of the exhaust gas turbocharger corresponding to the current operating point is reduced until the share of the resonant frequency decreases again to a value below the established limit. The established limit of the share of the resonant frequency is set at a level at which the exhaust gas turbocharger can still react spontaneously to changes when its maximum permissible compression ratio is reduced. This obviates the need for a significant reduction in the maximum permissible compression ratio to remove the turbocharger from unstable operation.

To detect a leak in the flow of charging air, a characteristic curve depicting the maximum permissible air mass flow over the current present compression ratio is provided for the exhaust gas turbocharger. The characteristic curve is in the form of a reduced air mass flow, wherein the actual air mass flow is brought down to a reduced air mass flow level while making allowances for the charging air temperature, the ambient air pressure, a reference temperature, and a reference pressure. If the recorded value, which has been brought down to the reduced air mass flow level, exceeds the maximum permissible value according to the characteristic curve, there is an air loss in the system. The maximum permissible air mass flow is only checked if the fuel injection volume, as a function of engine speed, is greater than is permissible during suction operation of the engine, i.e., only during actual supercharging operation.

In engines with exhaust gas re-circulation, the flow of air at the beginning of the exhaust gas re-circulation line may be constricted by oil or rust particles. During exhaust gas re-circulation operation, this constriction can be offset by a higher compression ratio of the exhaust gas turbocharger. Obstruction of the exhaust gas re-circulation line is detectable if the maximum permissible boost pressure of the exhaust gas turbocharger is reached at high atmospheric pressure, typically greater than 950 mbar. Using a meter, the number of times the maximum permissible boost pressure is exceeded is counted, and an error message is reported whenever a limit value is exceeded.

In accordance with a further aspect of the invention, an apparatus for controlling a supercharging device for an internal combustion engine includes a controller having a range of control that includes at least four sub-ranges divided in accordance with a gradient (dx/dt) of the variable to be controlled (x) and a difference ($\Delta$x) between the variable to be controlled (x) and a control variable ($x_s$). The controller controls a variable (x) using different control characteristics in each of the at least four sub-ranges. In one preferred embodiment, the sub-ranges of the controller are divided according to a positive or negative difference ($\Delta$x) between the variable to be controlled (x) and the control variable ($x_s$) and according to a positive or negative gradient (dx/dt) of the variable to be controlled (x). The control characteristics include proportional and integral control. Preferably, more emphasis is placed on the integral control if the gradients (dx/dt) of the variable being controlled (x) is negative, and more emphasis is placed on the proportional control if the gradients (dx/dt) of the variable being controlled (x) is positive.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A method for controlling a supercharging device for an internal combustion engine, the method comprising the acts of:
   dividing a range of control into at least four sub-ranges in accordance with a gradient (dx/dt) of a variable to be controlled (x) and a difference ($\Delta$x) between the variable to be controlled (x) and a control variable ($x_s$); and
   controlling a variable (x) using different control characteristics in each of the at least four sub-ranges.

2. The method according to claim 1, wherein the control characteristics include proportional and integral control and, the method further comprising the act of: placing more emphasis on the integral control if the gradients (dx/dt) of the variable being controlled (x) is negative.

3. The method according to claim 1, wherein the control characteristics include proportional and integral control and, the method further comprising the act of: placing more emphasis on the proportional control if the gradients (dx/dt) of the variable being controlled (x) is positive.

4. The method according to claim 1, further comprising the acts of: providing a default value of the supercharging device and a correction of the default value, which are subject to the actual fuel injection volume.

5. The method according to claim 1, further comprising the acts of: using an exhaust gas turbocharger as the supercharging device, and monitoring the control variable against a limiting characteristic curve of the maximum permissible compression ratio of the exhaust gas turbocharger.

6. The method according to claim 1, further comprising the acts of: using an exhaust gas turbocharger as the supercharging device, recording and analyzing fluctuations in boost pressure and/or in air mass flow in a suction path to detect unstable operating points of the exhaust gas turbocharger, and reducing a maximum permissible compression ratio of the exhaust gas turbocharger in the event of detection of an unstable state.

7. The method according to claim 1, further comprising the act of: using an exhaust gas turbocharger for a diesel engine of a motor vehicle as the supercharging device.

8. The method according to claim 1, further comprising the acts of: adding integral control to the control characteristics only when the variable to be controlled (x) has almost reached the control variable ($x_s$), falling within a predetermined range around the control variable ($x_s$).

9. The method according to claim 8, further comprising the act of: adding integral control to the control characteristics only when the variable to be controlled (x) has almost reached the control variable ($x_s$), falling within a predetermined range around the control variable ($x_s$).

10. The method according to claim 1, further comprising the acts of: using an air mass flow in a suction path as the control variable ($x_s$).

11. The method according to claim 10, further comprising the acts of: limiting the control variable ($x_s$) to a maximum permissible air mass flow determined as a function of engine speed and supercharging air temperature.

12. The method according to claim 1, further comprising the act of: dividing the sub-ranges according to a positive or negative difference ($\Delta$x) between the variable to be controlled (x) and the control variable ($x_s$) and according to a positive or negative gradient (dx/dt) of the variable to be controlled (x).

13. The method according to claim 12, wherein the control characteristics include proportional and integral control and, the method further comprising the act of: placing more emphasis on the controller components with integrating action in the case of negative gradients (dx/dt) of the variable being controlled (x).

14. The method according to claim 12, wherein the control characteristics include proportional and integral control and, the method further comprising the act of: placing more emphasis on the controller components with proportional action in the case of positive gradients (dx/dt) of the variable being controlled (x).

15. The method according to claim 12, further comprising the act of: providing a default value of the supercharging device and a correction of the default value, which are subject to the actual fuel injection volume.

16. The method according to claim 12, further comprising the acts of: using an exhaust gas turbocharger as the supercharging device, and monitoring the control variable against a limiting characteristic curve of the maximum permissible compression ratio of the exhaust gas turbocharger.

17. The method according to claim 12, further comprising the acts of: using an exhaust gas turbocharger as the supercharging device, recording and analyzing fluctuations in boost pressure and/or in air mass flow in a suction path to detect unstable operating points of the exhaust gas turbocharger, and reducing a maximum permissible compression ratio of the exhaust gas turbocharger in the event of detection of an unstable state.

18. The method according to claim 12, further comprising the act of: using an air mass flow in a suction path as the control variable ($x_s$).

19. The method according to claim 18, further comprising the act of: limiting the control variable ($x_s$) by a maximum permissible air mass flow determined as a function of engine speed and supercharging air temperature.

20. The method according to claim 19, further comprising the acts of: using an exhaust gas turbocharger as the supercharging device, and monitoring the control variable against a limiting characteristic curve of the maximum permissible compression ratio of the exhaust gas turbocharger.

21. The method according to claim 19, further comprising the acts of: using an exhaust gas turbocharger as the supercharging device, recording and analyzing fluctuations in boost pressure and/or in air mass flow in a suction path to detect unstable operating points of the exhaust gas turbocharger, and reducing a maximum permissible compression ratio of the exhaust gas turbocharger in the event of detection of an unstable state.

22. An apparatus for controlling a supercharging device for an internal combustion engine, the apparatus comprising
   a controller having
      a range of control that includes
         at least four sub-ranges devided in accordance with a gradient (dx/dt) of a variable to be controlled (x) and a difference ($\Delta$x) between the variable to be controlled (x) and a control variable ($x_s$), wherein the controller controls the variable (x) using different control characteristics in each of the at least four sub-ranges.

23. The apparatus according to claim 22, wherein the sub-ranges of the controller are divided according to a positive or negative difference ($\Delta$x) between the variable to be controlled (x) and the control variable ($x_s$) and according to a positive or negative gradient (dx/dt) of the variable to be controlled (x).

24. The apparatus according to claim 22, wherein the control characteristics include proportional and integral control.

25. The apparatus according to claim 22, wherein more emphasis is placed on the integral control if the gradients (dx/dt) of the variable being controlled (x) is negative, and more emphasis is placed on the proportional control if the gradients (dx/dt) of the variable being controlled (x) is positive.

* * * * *